(12) United States Patent
Wang et al.

(10) Patent No.: US 12,300,133 B2
(45) Date of Patent: May 13, 2025

(54) DISPLAY PANEL AND DISPLAY DEVICE

(71) Applicants: Beijing BOE Optoelectronics Technology Co., Ltd., Beijing (CN); BOE Technology Group Co., Ltd., Beijing (CN)

(72) Inventors: Desheng Wang, Beijing (CN); Zhichao Yang, Beijing (CN); Yong Zhang, Beijing (CN); Jian Wang, Beijing (CN); Lingfang Nie, Beijing (CN); Longhu Hao, Beijing (CN); Yashuai An, Beijing (CN); Peipei Wang, Beijing (CN); Zanwu Guo, Beijing (CN); Zhaohu Yu, Beijing (CN); Feng Qu, Beijing (CN); Xiaofeng Yin, Beijing (CN); Jing Pang, Beijing (CN); Qi Deng, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/921,486

(22) PCT Filed: Nov. 29, 2021

(86) PCT No.: PCT/CN2021/134038
§ 371 (c)(1),
(2) Date: Oct. 26, 2022

(87) PCT Pub. No.: WO2023/092561
PCT Pub. Date: Jun. 1, 2023

(65) Prior Publication Data
US 2024/0404436 A1    Dec. 5, 2024

(51) Int. Cl.
G09G 3/00      (2006.01)
G02F 1/1362    (2006.01)
G09G 3/36      (2006.01)

(52) U.S. Cl.
CPC ....... G09G 3/006 (2013.01); G02F 1/136254 (2021.01); G02F 1/136286 (2013.01);
(Continued)

(58) Field of Classification Search
CPC ...................................................... G09G 3/006
See application file for complete search history.

(56) References Cited

U.S. PATENT DOCUMENTS 11,217,609 B1      1/2022   Gao et al.
2001/0045997 A1   11/2001   Kim
(Continued)

FOREIGN PATENT DOCUMENTS

CN    102681224 A    9/2012
CN    103345080 A   10/2013
(Continued)

*Primary Examiner* — Nan-Ying Yang
(74) *Attorney, Agent, or Firm* — WHDA, LLP

(57) ABSTRACT

The display panel includes an active area and a border-frame area located at a periphery of the active area, the active area includes a plurality of sub-pixels and a plurality of data lines connected to the sub-pixels, and the border-frame area includes a testing area and a bonding area; the testing area includes a plurality of testing units that are arranged periodically in a first direction, each of the testing units includes one or more switching transistors, a first electrode of each of the switching transistors is connected to a testing-signal lead wire, and a second electrode is connected to one of the data lines; the bonding area includes a plurality of bonding units that are arranged periodically in the first direction, each of (Continued)

the bonding units includes one or more bonding pads, and each of the bonding pads is connected to one of the data lines.

18 Claims, 9 Drawing Sheets

(52) U.S. Cl.
CPC ......... *G09G 3/3607* (2013.01); *G09G 3/3648* (2013.01); *G09G 2330/12* (2013.01)

(56) References Cited

U.S. PATENT DOCUMENTS

| | | |
|---|---|---|
| 2005/0057273 A1 | 3/2005 | Lin et al. |
| 2007/0018680 A1* | 1/2007 | Jeon ................... G09G 3/006 324/760.02 |
| 2015/0014686 A1 | 1/2015 | Lv |
| 2016/0260367 A1* | 9/2016 | Kwak ................... G09G 3/006 |
| 2017/0025051 A1 | 1/2017 | Li et al. |
| 2017/0123249 A1 | 5/2017 | Yoshida et al. |
| 2018/0203303 A1 | 7/2018 | Liu et al. |
| 2020/0103693 A1 | 4/2020 | Chen et al. |
| 2020/0343270 A1 | 10/2020 | Huang |
| 2022/0254285 A1 | 8/2022 | Wang et al. |

FOREIGN PATENT DOCUMENTS

| | | |
|---|---|---|
| CN | 104298039 A | 1/2015 |
| CN | 104933979 A | 9/2015 |
| CN | 105676495 A | 6/2016 |
| CN | 106324928 A | 1/2017 |
| CN | 106847864 A | 6/2017 |
| CN | 109001945 A | 12/2018 |
| CN | 109491154 A | 3/2019 |
| CN | 109841181 A | 6/2019 |
| CN | 109872667 A | 6/2019 |
| CN | 111509026 A | 8/2020 |
| CN | 111650793 A | 9/2020 |
| CN | 111739453 A | 10/2020 |
| CN | 112018086 A | 12/2020 |
| CN | 112270908 A | 1/2021 |
| CN | 113448114 A | 9/2021 |
| JP | 6324499 B2 | 5/2018 |
| KR | 20060115518 A | 11/2006 |

* cited by examiner

DISPLAY PANEL AND DISPLAY DEVICE

TECHNICAL FIELD

The present disclosure relates to the technical field of displaying and, more particularly, to a display panel and a display device.

BACKGROUND

Liquid-crystal display panels, as a type of extensively used flat display panels, are very important in the field of displaying. In order to reduce the production cost to the largest extent, in each of the process steps of the production of the display panels, imperfect detection is performed, to prevent waste of capital and material caused by defective products flowing into the subsequent process steps. For example, after the cell assembling process has been completed, it is required to perform a liquid-crystal cell test (CT) detection.

SUMMARY

The present disclosure provides a display panel, wherein the display panel includes an active area and a border-frame area located at a periphery of the active area, the active area includes a plurality of sub-pixels and a plurality of data lines connected to the sub-pixels, and the border-frame area includes a testing area and a bonding area;

the testing area includes a plurality of testing units that are arranged periodically in a first direction, each of the testing units includes one or more switching transistors, a first electrode of each of the switching transistors is connected to a testing-signal lead wire, the testing-signal lead wire is configured to transmit a testing signal, and a second electrode of the switching transistor is connected to one of the data lines;

the bonding area includes a plurality of bonding units that are arranged periodically in the first direction, each of the bonding units includes one or more bonding pads, and each of the bonding pads is connected to one of the data lines; and in the first direction, a ratio of a quantity of the switching transistors included in one arrangement period of the testing units to a quantity of the bonding pads included in one arrangement period of the bonding units is greater than 0 and less than 2.

In an alternative implementation, within the testing area, all of the testing-signal lead wires and the data lines extend in a second direction, wherein the second direction is perpendicular to the first direction; and a part of the testing-signal lead wire is further used as the first electrode of the switching transistor, and a part of the data line is further used as the second electrode of the switching transistor.

In an alternative implementation, each of the testing units includes a plurality of instances of the switching transistors;

within the testing unit, all of first electrodes of the switching transistors are located on same sides of second electrodes of the switching transistor, and orthographic projections of the switching transistors in a second direction do not intersect or overlap with each other, wherein the second direction is perpendicular to the first direction; and the plurality of switching transistors include a first transistor and a second transistor, and an orthographic projection of a second electrode of the first transistor and an orthographic projection of a first electrode of the second transistor in the first direction intersect or overlap.

In an alternative implementation, within the testing unit, the plurality of switching transistors further include a third transistor, the third transistor is close to the second transistor, and an orthographic projection of the second electrode of the second transistor and an orthographic projection of a first electrode of the third transistor in the first direction intersect or overlap.

In an alternative implementation, the testing area and the bonding area are located on two opposite sides of the active area.

In an alternative implementation, the testing area and the bonding area are located on a same one side of the active area, and the bonding area is located between the active area and the testing area.

In an alternative implementation, the data lines include data transmission lines and data inputting lines, two ends of each of the data transmission lines are connected to the second electrode of the switching transistor and a first end of the bonding pad, and a second end of the bonding pad is connected to one of the data inputting lines.

In an alternative implementation, each of the switching transistors includes a channel area, and a width-length ratio of the channel area is greater than or equal to 13/3, and less than or equal to 200/4.

In an alternative implementation, the ratio is 1.

In an alternative implementation, the border-frame area further includes an inputting area, the inputting area is located on one side of the testing area that is away from the active area, the inputting area includes a plurality of testing-signal bus lines, and an extending direction of the testing-signal bus lines intersects with an extending direction of the testing-signal lead wires; and the testing-signal bus lines are connected to the testing-signal lead wires, and the testing-signal bus lines are configured to input a testing signal via the testing-signal lead wires to data lines of sub-pixels of a same color.

In an alternative implementation, the plurality of testing-signal bus lines include at least one internal transmission bus, and the internal transmission bus is located at a first metal layer;

the testing-signal lead wires are located at a second metal layer, and a first insulating layer is disposed between the first metal layer and the second metal layer;

a second insulating layer is disposed on one side of the second metal layer that is back away from the first metal layer, a first electrode layer is disposed on one side of the second insulating layer that is back away from the first metal layer, and the first electrode layer includes a plurality of switching electrodes; or a third insulating layer is disposed on one side of the first metal layer that is back away from the second metal layer, a second electrode layer is disposed on one side of the third insulating layer that is back away from the second metal layer, and the second electrode layer includes a plurality of switching electrodes;

the testing-signal lead wires and the internal transmission bus are connected by the switching electrodes; and a first part of each of the switching electrodes is connected to one of the testing-signal lead wires by a first via hole, and a second part of the switching electrode is connected to the internal transmission bus by a second via hole.

In an alternative implementation, an orthographic projection of the first via hole on a plane where the testing-signal lead wire is located is located within an area of the testing-signal lead wire.

In an alternative implementation, the at least one internal transmission bus includes a first internal bus and a second internal bus, and the first internal bus is located on one side of the second internal bus that is close to the active area;

an arranging direction of a first via hole and a second via hole that connect the testing-signal lead wire and the first internal bus is perpendicular to an extending direction of the first internal bus; and an arranging direction of a first via hole and a second via hole that connect the testing-signal lead wire and the second internal bus is parallel to an extending direction of the second internal bus.

In an alternative implementation, the plurality of testing-signal bus lines further include an edge transmission bus, the edge transmission bus is located on one side of the at least one internal transmission bus that is away from the active area, the edge transmission bus is located at the second metal layer, and the edge transmission bus and the testing-signal lead wires that are interconnected are of an integral structure.

In an alternative implementation, the plurality of testing-signal bus lines include a first testing-signal bus, a second testing-signal bus line and a third testing-signal bus;

the first testing-signal bus line is configured to input a first testing signal to data lines of first-color sub-pixels, the second testing-signal bus line is configured to input a second testing signal to data lines of second-color sub-pixels, and the third testing-signal bus line is configured to input a third testing signal to data lines of third-color sub-pixels; and emitted-light colors of the first-color sub-pixels, the second-color sub-pixels and the third-color sub-pixels are different from each other.

In an alternative implementation, the plurality of testing-signal bus lines further include a fourth testing-signal bus, and the fourth testing-signal bus line is configured to input a fourth testing signal to data lines of fourth-color sub-pixels; and emitted-light colors of the fourth-color sub-pixels and the first-color sub-pixels are the same, and the data lines connected to the fourth testing-signal bus line and the data lines connected to the first testing-signal bus line are alternately arranged.

In an alternative implementation, the plurality of testing-signal bus lines further include a fifth testing-signal bus, and the fifth testing-signal bus line is configured to input a fifth testing signal to data lines of fifth-color sub-pixels; and emitted-light colors of the fifth-color sub-pixels and the second-color sub-pixels are the same, and the data lines connected to the fifth testing-signal bus line and the data lines connected to the second testing-signal bus line are alternately arranged.

In an alternative implementation, the plurality of testing-signal bus lines further include a sixth testing-signal bus, and the sixth testing-signal bus line is configured to input a sixth testing signal to data lines of sixth-color sub-pixels; and emitted-light colors of the sixth-color sub-pixels and the third-color sub-pixels are the same, and the data lines connected to the sixth testing-signal bus line and the data lines connected to the third testing-signal bus line are alternately arranged.

In an alternative implementation, the inputting area further includes a first signal inputting terminal, a second signal inputting terminal and a third signal inputting terminal; and both of the fourth testing-signal bus line and the first testing-signal bus line are connected to the first signal inputting terminal, both of the fifth testing-signal bus line and the second testing-signal bus line are connected to the second signal inputting terminal, and both of the sixth testing-signal bus line and the third testing-signal bus line are connected to the third signal inputting terminal.

In an alternative implementation, within the inputting area, a plurality of instances of the testing-signal lead wires form a plurality of lead-wire units, and the plurality of lead-wire units are arranged periodically in the first direction; and in the first direction, a ratio of an arrangement period of the lead-wire units to an arrangement period of the bonding units is equal to a ratio of a quantity of the testing-signal lead wires included in each of the lead-wire units to a quantity of the bonding pads included in each of the bonding units.

In an alternative implementation, the plurality of sub-pixels include sub-pixels of N colors, wherein N is greater than or equal to 1;

when the quantity of the testing-signal bus lines is N, and all of the data lines of the sub-pixels of a same color are connected to a same one instance of the testing-signal bus lines, the quantity of the testing-signal lead wires included in each of the lead-wire units is N; and when the quantity of the testing-signal bus lines is greater than $a \times N$, and less than or equal to $(a+1) \times N$, and a quantity of the testing-signal bus lines that are connected to all of the data lines of the sub-pixels of a same color is greater than or equal to a, and less than or equal to a+1, the quantity of the testing-signal lead wires included in each of the lead-wire units is $(a+1) \times N$, wherein a is a positive integer.

The present disclosure provides a display device, wherein the display device includes the display panel according to any one of the above embodiments.

The above description is merely a summary of the technical solutions of the present disclosure. In order to more clearly know the elements of the present disclosure to enable the implementation according to the contents of the description, and in order to make the above and other purposes, features and advantages of the present disclosure more apparent and understandable, the particular embodiments of the present disclosure are provided below.

BRIEF DESCRIPTION OF THE DRAWINGS

In order to more clearly illustrate the technical solutions of the embodiments of the present disclosure or the related art, the figures that are required to describe the embodiments or the related art will be briefly introduced below. Apparently, the figures that are described below are embodiments of the present disclosure, and a person skilled in the art may obtain other figures according to these figures without paying creative work. It should be noted that the proportions in the drawings are merely illustrative and do not indicate the actual proportions.

DETAILED DESCRIPTION

In order to make the objects, the technical solutions and the advantages of the embodiments of the present disclosure clearer, the technical solutions of the embodiments of the present disclosure will be clearly and completely described below with reference to the drawings of the embodiments of the present disclosure. Apparently, the described embodiments are merely certain embodiments of the present disclosure, rather than all of the embodiments. All of the other embodiments that a person skilled in the art obtains on the basis of the embodiments of the present disclosure without paying creative work fall within the protection scope of the present disclosure.

Switch Test is one type of the CT detection. After the procedure of the liquid-crystal cell has been completed, the liquid-crystal cell is lightened by loading an electric signal on the liquid-crystal cell, and imperfect detection and grade determination are performed artificially, to prevent waste caused by defective products flowing into the subsequent process steps. Because Switch Test may save one step of laser cutting process, which facilitates to increase the production capacity, it has been extensively applied.

Figure 1:
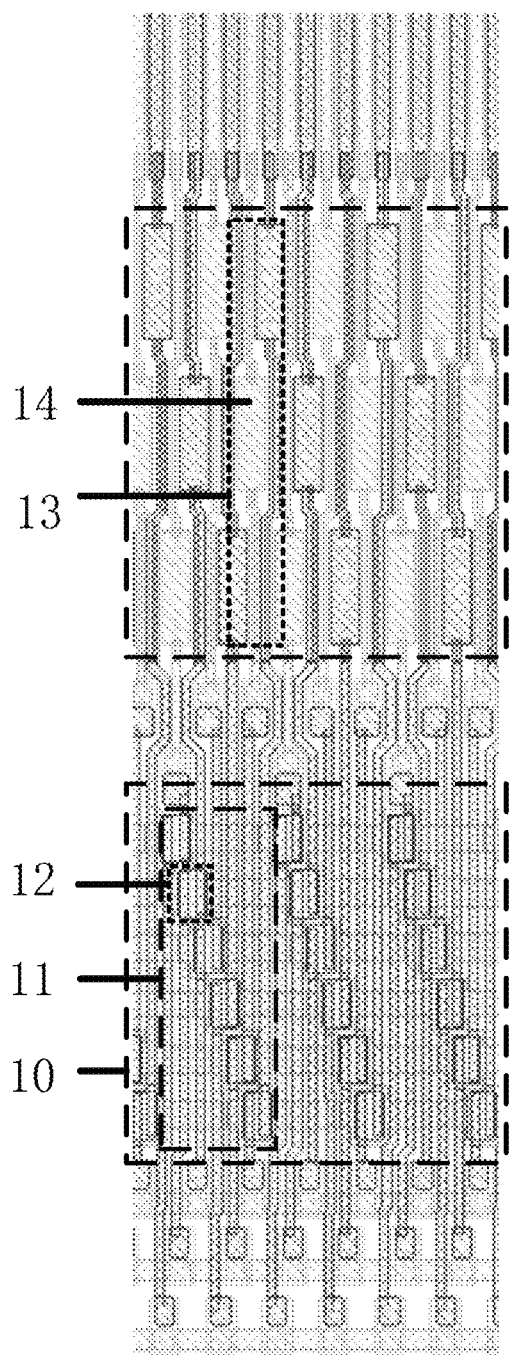
FIG. 1 schematically shows a schematic structural diagram of a display panel in the related art.

Referring to FIG. 1, FIG. 1 schematically shows a schematic structural diagram of a display panel in the related art. In the related art, a Switch Test structure 10 usually includes a plurality of first units 11 that are located within a border-frame area and are arranged periodically in the transverse direction, and each of the first units 11 includes a certain quantity of thin-film transistors 12. The border-frame area usually further includes a plurality of second units 13 that are arranged periodically in the transverse direction, and each of the second units 13 includes a certain quantity of bonding pads 14. In the related art, the quantity of the thin-film transistors 12 included in each of the first units 11 is usually two times the quantity of the bonding pads 14 included in each of the second units 13.

When the second unit 13 includes three bonding pads 14 that are arranged longitudinally, as shown in FIG. 1, each of the first units 11 includes six thin-film transistors 12 that are arranged longitudinally. Because the six thin-film transistors 12 that are arranged longitudinally occupy a large room, it is not suitable for narrow-border-frame products.

Figure 2:
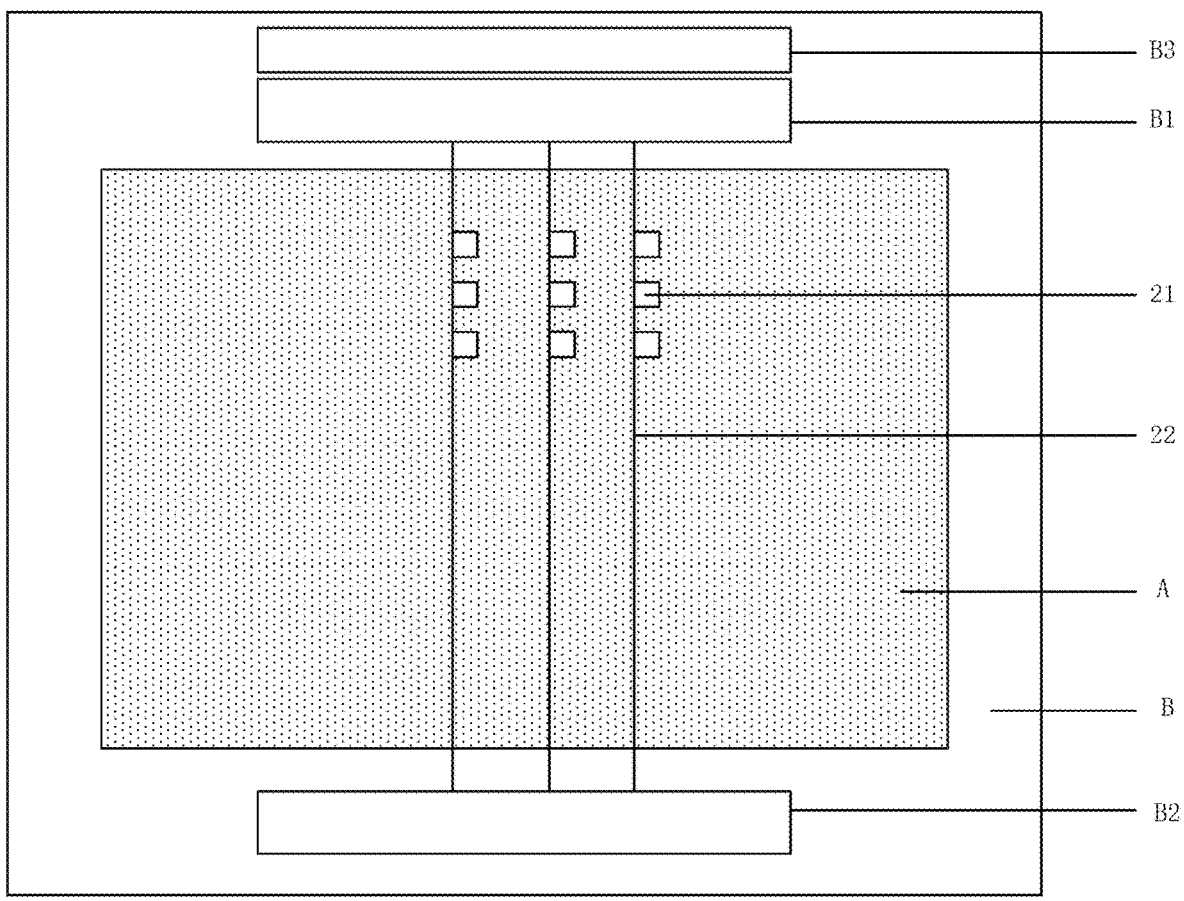
FIG. 2 schematically shows a schematic structural diagram showing a plane of a display panel according to the present disclosure.

In order to solve the above problem, an embodiment of the present disclosure provides a display panel. Referring to FIG. 2, FIG. 2 schematically shows a schematic structural diagram showing a plane of a display panel according to the present disclosure. As shown in FIG. 2, the display panel includes an active area A and a border-frame area B located at the periphery of the active area A, the active area A includes a plurality of sub-pixels 21 and a plurality of data lines 22 connected to the sub-pixels 21, and the border-frame area B includes a testing area B1 and a bonding area B2.

Figure 3:
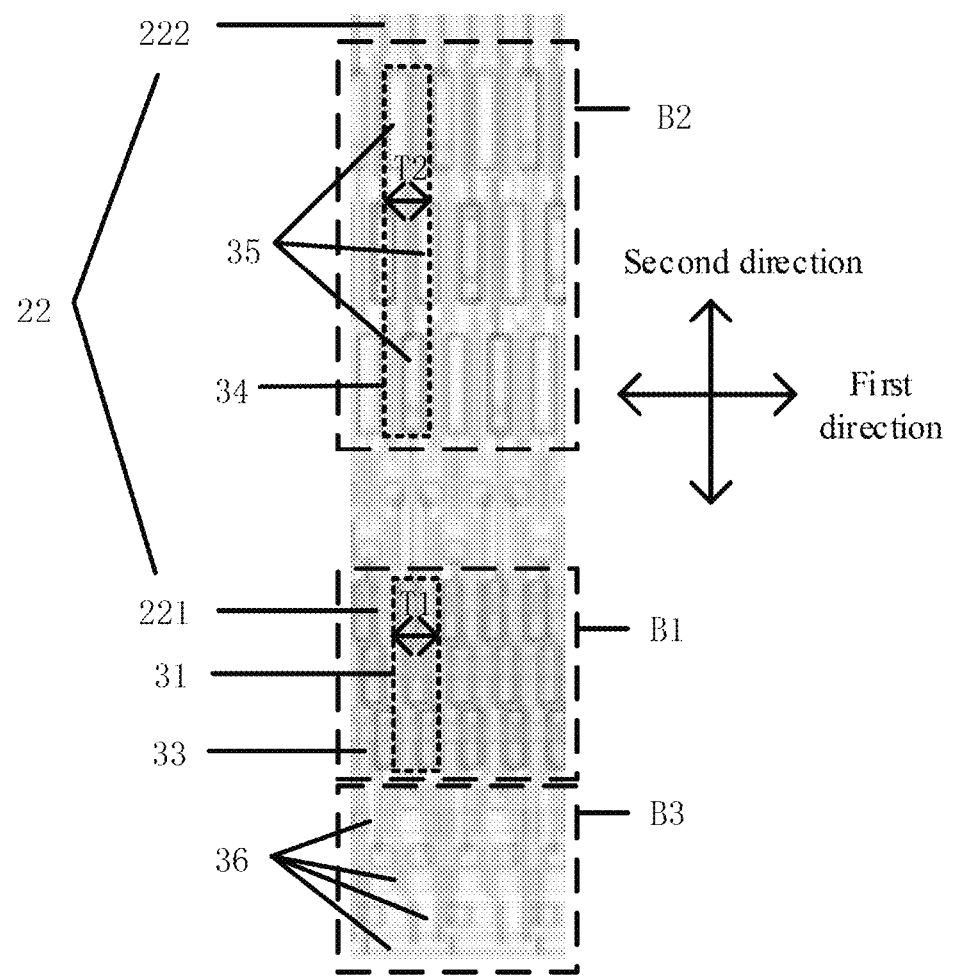
FIG. 3 schematically shows a schematic structural diagram of the border-frame area of a display panel according to the present disclosure.
Figure 4:
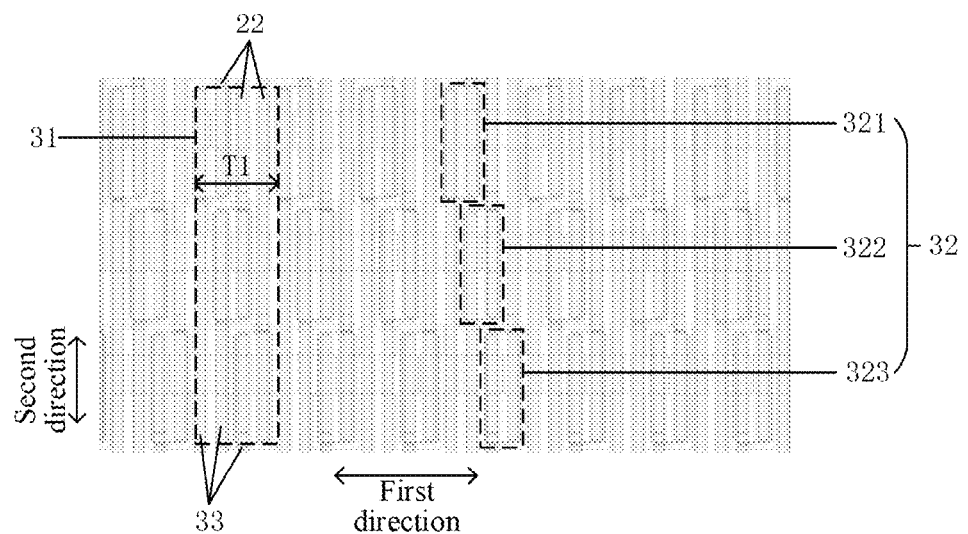
FIG. 4 schematically shows a schematic structural diagram of the testing area of the first type of the display panel according to the present disclosure.

Referring to FIG. 3, FIG. 3 schematically shows a schematic structural diagram of the border-frame area of a display panel according to the present disclosure. Referring to FIG. 4, FIG. 4 shows a locally schematic structural diagram of the testing area B1 in FIG. 3. As shown in FIG. 4, the testing area B1 includes a plurality of testing units 31 that are arranged periodically in a first direction, each of the testing units 31 includes one or more switching transistors 32, a first electrode of each of the switching transistors 32 is connected to a testing-signal lead wire 33, the testing-signal lead wire 33 is configured to transmit a testing signal, and a second electrode of the switching transistor 32 is connected to one of the data lines 22.

As shown in FIG. 3, the bonding area B2 includes a plurality of bonding units 34 that are arranged periodically in the first direction, each of the bonding units 34 includes one or more bonding pads 35, and each of the bonding pads 35 is connected to one of the data lines 22.

In the first direction, the ratio of the quantity of the switching transistors 32 included in one arrangement period T1 of the testing units 31 to the quantity of the bonding pads 35 included in one arrangement period T2 of the bonding units 34 is greater than 0 and less than 2.

In a particular implementation, the ratio of the arrangement period T1 of the testing units 31 to the arrangement period T2 of the bonding units 34 may be equal to the ratio of the quantity of the switching transistors 32 included in the testing unit 31 to the quantity of the bonding pads 35 included in the bonding unit 34.

In the present embodiment, the testing area B1 includes a plurality of switching transistors 32, and the plurality of switching transistors 32 form the plurality of testing units 31 that are arranged periodically in the first direction.

The bonding area B2 includes a plurality of bonding pads 35, and the plurality of bonding pads 35 form the plurality of bonding units 34 that are arranged periodically in the first direction.

The switching transistors 32 may, for example, be thin-film transistors and so on, which is not limited in the present disclosure. The switching transistors 32 are configured to control the switching-on and switching-off between the testing-signal lead wires 33 and the data lines 22.

When the switching transistor 32 is a thin-film transistor, the first electrode of the switching transistor 32 may be the source electrode of the thin-film transistor, and the second electrode may be the drain of the thin-film transistor. The grids of all of the switching transistors 32 within the testing area B1 may be connected together, and be controlled by the same one signal, which is not limited in the present disclosure.

In process of the CT detection, the testing signal may be inputted into the testing-signal lead wires 33, to control the switching transistors 32 to switch on the testing-signal lead wires 33 and the data lines 22, thereby inputting the testing signal into the sub-pixels of the active area.

Optionally, after the CT detection has been completed, grid electrodes of the switching transistors 32 within the testing area B1 may be connected to a switching-off signal, to ensure that the switching transistors 32 are in the switching-off state. The first electrodes of the switching transistors 32 may also be connected to a ground-potential signal, to prevent that, in normal displaying, an interference signal is inputted into the data lines 22 within the active area A, which results in abnormal displaying.

In the present embodiment, the bonding pads 35 within the bonding area B2 are configured to bond the driving chip. The driving chip is configured to, during the displaying of the display panel, provide a displaying signal to the sub-pixels 21 via the data lines 22.

In the present embodiment, when the quantity of the bonding pads 35 included in the bonding unit 34 is 3, the quantity of the switching transistors 32 included in the testing unit 31 is less than 6. Particularly, the quantity of the switching transistors 32 included in the testing unit 31 may, for example, be 3, 4 or 5. As compared with the display panel shown in FIG. 1, the display panel according to the present embodiment, by disposing a lower quantity of the switching transistors 32 within the testing unit 31, may reduce the room occupied by the testing units 31 perpendicular to the first direction, which facilitates to reduce the size of the border frame, and is suitable for narrow-border-frame products.

Furthermore, because the ratio of the arrangement period T1 of the testing units 31 to the arrangement period T2 of the bonding units 34 is equal to the ratio of the quantity of the switching transistors 32 included in the testing unit 31 to the quantity of the bonding pads 35 included in the bonding unit 34, within a certain width range in the first direction, the quantity of the switching transistors 32 and the quantity of the bonding pads 35 are equal, and are connected to each other correspondingly one to one. By the rational design, the length evenness of the data lines arranged between the switching transistors 32 and the bonding pads 35 may be improved.

In the direction perpendicular to the first direction, when the size of the testing area is constant, because a low quantity of the switching transistors 32 are arranged within the testing units 31, when the switching transistors 32 have a channel area, a channel area of a higher width-length ratio may be designed. The channel area of the higher width-length ratio allows a testing signal of a larger electric current to pass through, which may satisfy the demand on the detection of a larger-size display panel. In FIGS. 3 and 4, the width direction of the channel area is the second direction, and the length direction of the channel area is the first direction.

In the present embodiment, the second direction and the first direction are perpendicular to each other.

In a particular implementation, the structure of the bonding pads 35 within the bonding area B2 is the same as the structure of the outputting leads on the driving chip. The structure of the bonding pads 35 may, for example, include the arrangement period of the bonding pads 35, the quantity of the bonding pads 35 within each of the periods, and so on.

Figure 5:
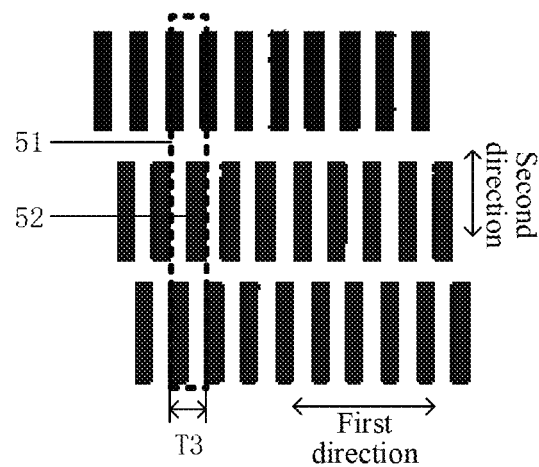
FIG. 5 schematically shows a schematic structural diagram of the first type of the driving chip according to the present disclosure.

As shown in FIG. 5, FIG. 5 shows a schematic structural diagram of the driving chip corresponding to the bonding area B2 shown in FIG. 3. As shown in FIG. 5, the driving chip includes a plurality of first lead units 51 that are arranged periodically in the first direction, each of the first lead units 51 includes three first leads 52, the three first leads 52 are arranged sequentially in the second direction, and two neighboring first leads 52 partially intersect or overlap in the first direction. The arrangement period T3 of the first lead units 51 in the first direction shown in FIG. 5 is 33 μm.

Correspondingly, as shown in FIG. 3, each of the bonding units 34 within the bonding area B2 includes three bonding pads 35, the three bonding pads 35 are arranged sequentially in the second direction, and two neighboring bonding pads 35 partially intersect or overlap in the first direction. The arrangement period T2 of the bonding units 34 in the first direction is 33 μm.

As shown in FIGS. 3 and 4, each of the testing units 31 within the testing area B1 includes three switching transistors 32, the three switching transistors 32 are arranged sequentially in the second direction, and two neighboring switching transistors 32 partially intersect or overlap in the first direction. The arrangement period T1 of the testing units 31 in the first direction is 33 μm.

In the display panel shown in FIG. 3, in the first direction, the ratio of the arrangement period T1 of the testing units 31 to the arrangement period T2 of the bonding units 34 is 1, and the ratio of the quantity of the switching transistors 32 included in the testing unit 31 to the quantity of the bonding pads 35 included in the bonding unit 34 is 1.

As shown in FIG. 4, within one arrangement period T1 of testing units 31, it is required to dispose four traces separately. Therefore, when the arrangement period T1 of the testing units 31 is 33 μm, the period of each of the traces is 33 μm/4-8.25 μm. Particularly, the width of the traces is 4.25 μm, and the spacing of the traces is 4 μm. Such trace width and trace spacing are the technical limits of common masks. Therefore, the structure of the testing area shown in FIGS. 3 and 4 may reduce the room occupation by the testing area in the first direction to the largest extent.

It should be noted that, regarding the bonding area B2 shown in FIG. 3, the testing area B1 is not limited to the structure shown in FIG. 3. The ratio of the arrangement period T1 of the testing units 31 to the arrangement period T2 of the bonding units 34, and the ratio of the quantity of the switching transistors 32 included in the testing unit 31 to the quantity of the bonding pads 35 included in the bonding unit 34, may also be other numerical values. For example, when the quantity of the bonding pads 35 included in the bonding unit 34 is 3, the quantity of the switching transistors 32 included in the testing unit 31 may also be 4 or 5; in other words, the ratio may be 4/3, 5/3 and so on. When the ratio is 4/3 and the arrangement period T2 of the bonding units 34 is 33 μm, the arrangement period T1 of the testing units 31 is 44 μm. When the ratio is 5/3 and the arrangement period T2 of the bonding units 34 is 33 μm, the arrangement period T1 of the testing units 31 is 55 μm.

As shown in FIGS. 3 and 4, by setting the ratio of the arrangement period T1 of the testing units 31 to the arrangement period T2 of the bonding units 34 and the ratio of the quantity of the switching transistors 32 included in the testing unit 31 to the quantity of the bonding pads 35 included in the bonding unit 34 to be 1, without exceeding the technical limits of common masks, the room occupation by the testing units 31 in the first direction and the second direction may be reduced to the largest extent, and the size of the border frame of the display panel may be reduced to the utmost extent.

Figure 6:
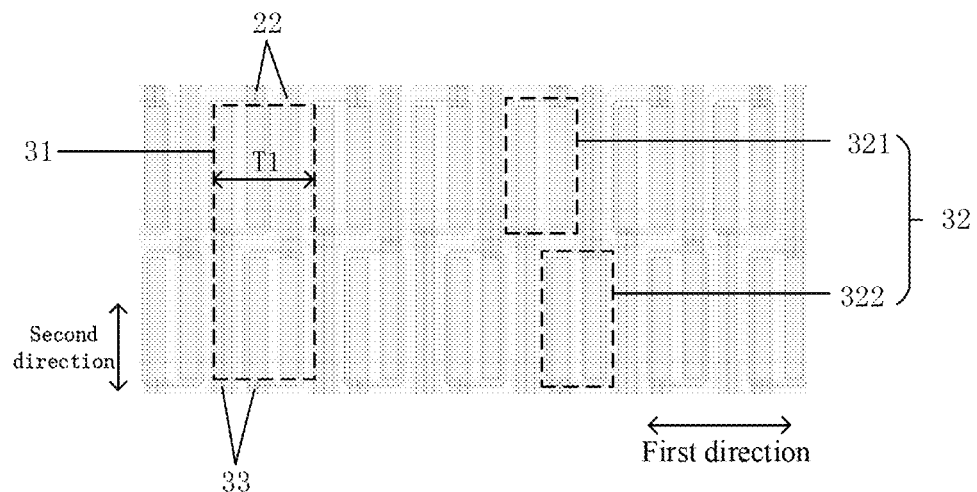
FIG. 6 schematically shows a schematic structural diagram of the testing area of the second type of the display panel according to the present disclosure.
Figure 7:
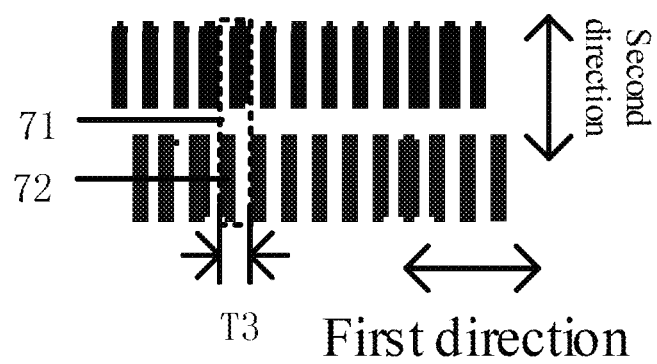
FIG. 7 schematically shows a schematic structural diagram of the second type of the driving chip according to the present disclosure.

When the quantity of the bonding pads 35 included in the bonding unit 34 is 2, referring to FIG. 6, FIG. 6 shows a schematic structural diagram of the corresponding testing area, and referring to FIG. 7, FIG. 7 shows a schematic structural diagram of the corresponding driving chip. As shown in FIG. 7, the driving chip includes a plurality of second lead units 71 that are arranged periodically in the first direction, each of the second lead units 71 includes two second leads 72, the two second leads 72 are arranged sequentially in the direction perpendicular to the first direction, and two neighboring second leads 72 partially intersect or overlap in the first direction. The arrangement period T3 of the second lead units 71 in the first direction shown in FIG. 7 is 28 µm.

Correspondingly, within the bonding area B2 configured to bond the driving chip shown in FIG. 7, each of the bonding units 34 includes two bonding pads 35, the two bonding pads 35 are arranged sequentially in the direction perpendicular to the first direction, and two neighboring bonding pads 35 partially intersect or overlap in the first direction. The arrangement period T2 of the bonding units 34 in the first direction is 28 µm.

As shown in FIG. 6, each of the testing units 31 within the testing area B1 includes two switching transistors 32, the two switching transistors 32 are arranged sequentially in the second direction, and two neighboring switching transistors 32 partially intersect or overlap in the first direction. The arrangement period T1 of the testing units 31 in the first direction is 28 µm.

within the testing area shown in FIG. 6, in the first direction, the ratio of the arrangement period T1 of the testing units 31 to the arrangement period T2 of the bonding units 34 is 1; in other words, the ratio of the quantity of the switching transistors 32 included in the testing unit 31 to the quantity of the bonding pads 35 included in the bonding unit 34 is 1. In other words, the quantity of the bonding pads 35 included in the bonding unit 34 is 2, and the quantity of the switching transistors 32 included in the testing unit 31 is 2.

It should be noted that, when the quantity of the bonding pads 35 included in the bonding unit 34 is 2, the quantity of the switching transistors 32 included in the testing unit 31 may also be 1 or 3; in other words, the ratio may be 1/2, 3/2 and so on. When the ratio is 1/2 and the arrangement period T2 of the bonding units 34 is 28 µm, the arrangement period T1 of the testing units 31 is 14 µm. When the ratio is 3/2 and the arrangement period T2 of the bonding units 34 is 28 µm, the arrangement period T1 of the testing units 31 is 42 µm.

As shown in FIG. 6, within one arrangement period T1 of testing units 31, it is required to dispose 2 traces separately. When the arrangement period T1 of the testing units 31 is 14 µm, the period of the traces is 14 µm/2-7 µm; in other words, the sum of the trace width and the trace spacing is 7 µm, which numerical value is less than the technical limit 8.25 µm of common masks.

As shown in FIG. 6, by setting the ratio of the arrangement period T1 of the testing units 31 to the arrangement period T2 of the bonding units 34 and the ratio of the quantity of the switching transistors 32 included in the testing unit 31 to the quantity of the bonding pads 35 included in the bonding unit 34 to be 1, without exceeding the technical limits of common masks, the room occupation by the testing units 31 in the first direction and the second direction may be reduced to the largest extent, and the size of the border frame of the display panel may be reduced to the utmost extent.

Therefore, in an alternative implementation, the ratio of the arrangement period T1 of the testing units 31 to the arrangement period T2 of the bonding units 34 is equal to the ratio of the quantity of the switching transistors 32 included in the testing unit 31 to the quantity of the bonding pads 35 included in the bonding unit 34, and the ratio is 1. Accordingly, without exceeding the technical limits of common masks, the room occupation by the testing units 31 in the first direction and the second direction may be reduced to the largest extent, and the size of the border frame of the display panel may be reduced to the utmost extent.

In a particular implementation, the testing area B1 and the bonding area B2 may have multiple modes of being arranged within the border-frame area B.

In a first implementation, the testing area B1 and the bonding area B2 are located on two opposite sides of the active area A, as shown in FIG. 2. In the present implementation, one end of each of the data lines 22 is connected to the second electrode of one of the switching transistors 32, and the other end is connected to one of the bonding pads 35.

In a second implementation, as shown in FIG. 3, the testing area B1 and the bonding area B2 are located on the same one side of the active area A, and the bonding area B2 is located between the active area A and the testing area B1. By disposing the testing area B1 and the bonding area B2 on the same one side of the active area A, the structure of the border-frame area B may be configured to be more compact, which facilitates to further reduce the size of the border frame.

As shown in FIG. 3, the data lines 22 may include data transmission lines 221 and data inputting lines 222, the two ends of each of the data transmission lines 221 are connected to the second electrode of the switching transistor 32 and a first end of the bonding pad 35, and a second end of the bonding pad 35 is connected to one of the data inputting lines 222.

The bonding pads 35 are located between the data transmission lines 221 and the data inputting lines 222, the data transmission lines 221 and the data inputting lines 222 are connected by the bonding pads 35, the second electrodes of the switching transistors 32 within the testing area B1 are connected to the data transmission lines 221, and the first electrodes are connected to the testing-signal lead wires 33. When the first electrodes and the second electrodes of the switching transistors 32 are switched on, the testing signal in the testing-signal lead wires 33 may be transmitted into the data transmission lines 221 and the data inputting lines 222.

In the present implementation, by disposing the bonding area B2 between the active area A and the testing area B1, in the CT detection, the testing signal is, from the testing-signal lead wires 33, sequentially transmitted into the data transmission lines 221, the bonding pads 35 and the data inputting lines 222. Therefore, the CT detection may detect the imperfects within the bonding area B2 and the active area A at a same time, to result in a more complete detection scope.

In a particular implementation, each of the switching transistors 32 may include a channel area. The width-length ratio of the channel area may be greater than or equal to 13/3, and less than or equal to 200/4. For example, the width-length ratio of the channel area may be 42/4, 50/4 and so on. In a particular implementation, the width-length ratio of the channel area may be determined according to factors such as the practical available room and the process conditions, which is not limited in the present disclosure.

Because the switching transistor 32 having the channel area of a higher width-length ratio may allow a testing signal of a larger electric current to pass through, the demand on the detection of a larger-size display panel may be satisfied.

Optionally, within the testing area B1, as shown in FIGS. 4 and 6, all of the testing-signal lead wires 33 and the data lines 22 extend in a second direction, wherein the second direction is perpendicular to the first direction.

Optionally, as shown in FIGS. 4 and 6, a part of the testing-signal lead wire 33 is further used as the first electrode of the switching transistor 32, and a part of the data line 22 is further used as the second electrode of the switching transistor 32.

By using a part of the testing-signal lead wire 33 as the first electrode of the switching transistor 32, and using a part of the data line 22 as the second electrode of the switching transistor 32, the film layers of the switching transistor 32 are not required to be separately disposed, which may reduce the difficulty in the producing process, and save the producing cost.

In an alternative implementation, as shown in FIGS. 4 and 6, each of the testing units 31 includes a plurality of switching transistors 32. In other words, each of the testing units 31 includes at least two switching transistors 32.

As shown in FIGS. 4 and 6, within the testing unit 31, all of the first electrodes of the switching transistors 32 are located on the same sides of the second electrodes, and the orthographic projections of the switching transistors 32 in the second direction do not intersect or overlap with each other, wherein the second direction is perpendicular to the first direction.

That all of the first electrodes of the switching transistors 32 are located on the same sides of the second electrodes refers to that the first electrodes of all of the switching transistors 32 are close to the same one edge of the testing area B1. As shown in FIGS. 4 and 6, the first electrodes of all of the switching transistors 32 within the testing unit 31 are located on the left sides of the second electrodes; in other words, the first electrodes of all of the switching transistors 32 are close to the left edge of the testing area B1.

As shown in FIGS. 4 and 6, the plurality of switching transistors 32 within the testing unit 31 may include a first transistor 321 and a second transistor 322, and the orthographic projection of the second electrode of the first transistor 321 and the orthographie projection of the first electrode of the second transistor 322 in the first direction intersect or overlap. By configuring that the second electrode of the first transistor 321 and the first electrode of the second transistor 322 intersect or overlap with each other in the first direction, the room in the first direction may be effectively utilized, to reduce the room occupation by the testing unit 31 in the first direction.

Optionally, the orthographic projection of the second electrode of the first transistor 321 and the orthographic projection of the first electrode of the second transistor 322 in the first direction may completely intersect or overlap, as shown in FIGS. 4 and 6. By configuring that the second electrode of the first transistor 321 and the first electrode of the second transistor 322 completely intersect or overlap in the first direction, the room occupation by the testing unit 31 in the first direction may be reduced to the largest extent.

When the testing unit 31 includes at least three switching transistors 32, the plurality of switching transistors 32 within the testing unit 31 may further include a third transistor 323. As shown in FIG. 4, the third transistor 323 is close to the second transistor 322, and the orthographic projection of the second electrode of the second transistor 322 and the orthographic projection of the first electrode of the third transistor 323 in the first direction intersect or overlap. By configuring that the second electrode of the second transistor 322 and the first electrode of the third transistor 323 intersect or overlap with each other in the first direction, the room in the first direction may be effectively utilized, to reduce the room occupation by the testing unit 31 in the first direction.

Optionally, the orthographic projection of the second electrode of the second transistor 322 and the orthographic projection of the first electrode of the third transistor 323 in the first direction may completely intersect or overlap, as shown in FIG. 4. By configuring that the second electrode of the second transistor 322 and the first electrode of the third transistor 323 completely intersect or overlap in the first direction, the room occupation by the testing unit 31 in the first direction may be reduced to the largest extent.

In order to input the testing signal into the testing-signal lead wires 33, in a particular implementation, as shown in FIG. 2, the border-frame area B may further include an inputting area B3, and the inputting area B3 may be located on the side of the testing area B1 that is away from the active area A. By disposing the inputting area B3 on the side of the testing area B1 that is away from the active area A, there is a small distance between the testing area B1 and the inputting area B3, which may save the room occupied by the connecting lines between them, to facilitate to reduce the size of the border-frame area.

As shown in FIG. 3, the inputting area B3 may include a plurality of testing-signal bus lines 36, and the extending direction of the testing-signal bus lines 36 intersects with the extending direction of the testing-signal lead wires 33.

The testing-signal bus lines 36 are connected to the festing-signal lead wires 33, and the testing-signal bus lines 36 are configured to input a testing signal via the testing-signal lead wires 33 to data lines 22 of sub-pixels of the same color. In other words, the emitted-light colors of the sub-pixels that are connected to the same one testing-signal bus line 36 are the same.

The extending direction of the testing-signal bus lines 36 may, for example, be the first direction, as shown in FIG. 3, which is not limited in the present disclosure.

In a particular implementation, there may be multiple modes of connection between the testing-signal bus lines 36 and the testing-signal lead wires 33. Referring to FIGS. 10 to 13, FIGS. 10 to 13 schematically show schematic structural diagrams showing a plane of some types of the inputting area.

Figure 8:
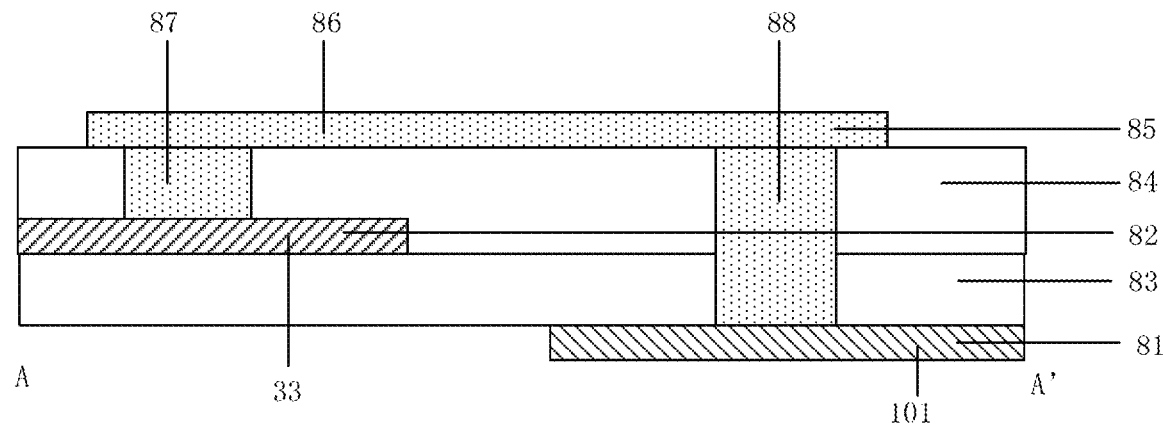
FIG. 8 schematically shows a schematic sectional structural diagram at the position AA' of the inputting area according to the present disclosure.
Figure 9:
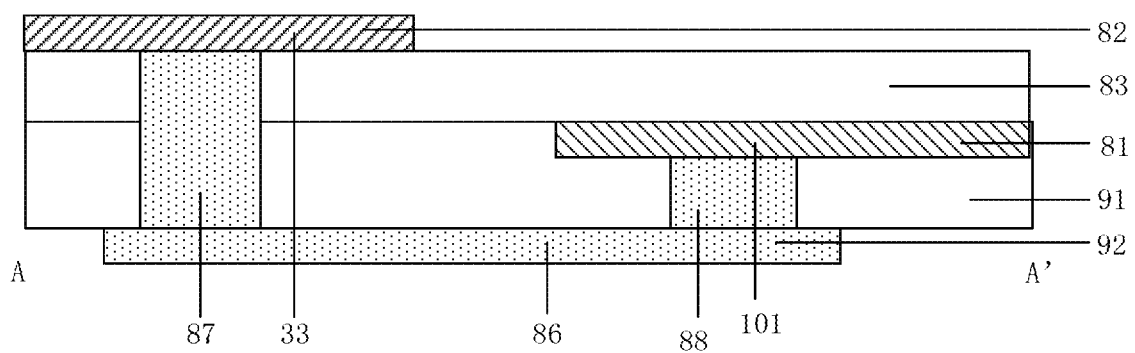
FIG. 9 schematically shows another schematic sectional structural diagram at the position AA' of the inputting area according to the present disclosure.

In an alternative implementation, as shown in FIGS. 10 to 13, the plurality of testing-signal bus lines 36 include at least one internal transmission bus 101. Referring to FIGS. 8 and 9, FIGS. 8 and 9 individually show a schematic sectional structural diagram of the position of the connection between a testing-signal lead wire and the internal transmission bus. As shown in FIGS. 8 and 9, the internal transmission bus 101 is located at a first metal layer 81, the testing-signal lead wires 33 are located at a second metal layer 82, and a first insulating layer 83 is disposed between the first metal layer 81 and the second metal layer 82.

As shown in FIG. 8, a second insulating layer 84 is disposed on the side of the second metal layer 82 that is back away from the first metal layer 81, a first electrode layer 85 is disposed on the side of the second insulating layer 84 that is back away from the first metal layer 81, and the first electrode layer 85 includes a plurality of switching electrodes 86. Alternatively, as shown in FIG. 9, a third insulating layer 91 is disposed on one side of the first metal layer 81 that is back away from the second metal layer 82, a second electrode layer 92 is disposed on one side of the third insulating layer 91 that is back away from the second metal layer 82, and the second electrode layer 92 includes a plurality of switching electrodes 86.

As shown in FIGS. 8 and 9, the testing-signal lead wires 33 and the internal transmission bus 101 are connected by the switching electrodes 86. A first part of each of the switching electrodes 86 is connected to one of the testing-signal lead wires 33 by a first via hole 87, and a second part of the switching electrode 86 is connected to the internal transmission bus 101 by a second via hole 88.

The first metal layer S1 may, for example, be in the same one layer and have the same material as the grid lines within the active area, the second metal layer 82 may be in the same one layer and have the same material as the data lines within the active area, and the switching electrodes 86 may be in the same one layer and have the same material as the pixel electrodes within the active area A, which are not limited in the present disclosure.

In the present implementation, by connecting the switching electrodes 86 to the testing-signal lead wires 33 and the internal transmission bus 101 by the via holes, because first via holes 87 and the second via holes 88 may be formed synchronously with the via holes that interconnect the pixel electrodes within the active area and the drain electrodes of the thin-film transistors in the sub-pixels, it is not required to separately add a mask, which may reduce the difficulty in the producing process, and save the producing cost.

In a particular implementation, the testing-signal lead wires 33 and the internal transmission bus 101 may also be connected by the via holes disposed in the first insulating layer 83. The mode of connection between the testing-signal bus lines 36 and the testing-signal lead wires 33 is not limited in the present disclosure.

Optionally, as shown in FIGS. 8 and 9, the orthographic projection of the first via hole 87 on the plane where the testing-signal lead wire 33 is located is located within the area of the testing-signal lead wire 33. By configuring that the testing-signal lead wire 33 completely covers the orthographic projection of the first via hole 87 on the plane where the testing-signal lead wire 33 is located, the risk of hole-jumping failure and extremely large resistance at the position of the first via hole 87 may be reduced.

Optionally, as shown in FIGS. 10 to 13, at least one internal transmission bus 101 includes a first internal bus 111, and the arranging direction of the first via hole 87 and the second via hole 88 that connect the testing-signal lead wire 33 and the first internal bus 111 may be perpendicular to the extending direction of the first internal bus 111.

As shown in FIGS. 10 to 13, the orthographic projection of the first via hole 87 connecting the testing-signal lead wire 33 and the first internal bus 111 on the plane where the first internal bus 111 is located is located on the side of the first internal bus 111 that is close to the active area A, and the orthographic projection of the first via hole 87 connecting the testing-signal lead wire 33 and the first internal bus 111 on the plane where the first internal bus 111 is located is located within the area of the first internal bus 111.

Figure 11:
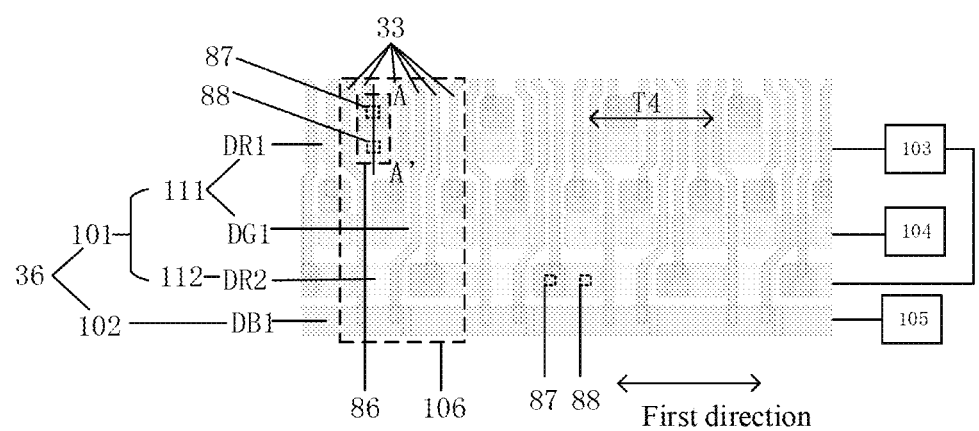
FIG. 11 schematically shows a schematic structural diagram of the second type of the inputting area according to the present disclosure.
Figure 12:
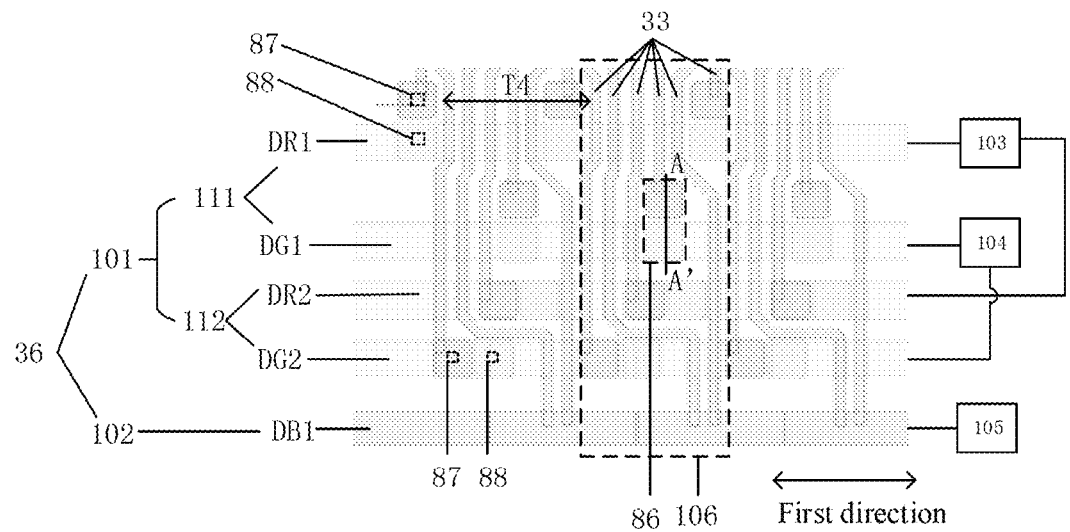
FIG. 12 schematically shows a schematic structural diagram of the third type of the inputting area according to the present disclosure.
Figure 13:
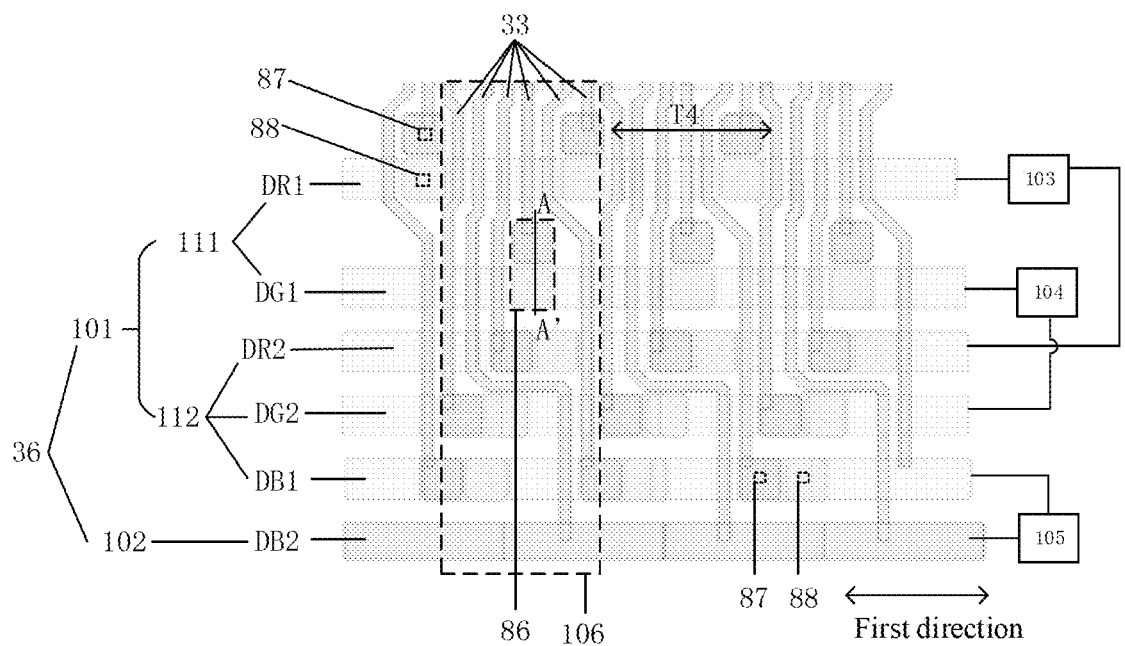
FIG. 13 schematically shows a schematic structural diagram of the fourth type of the inputting area according to the present disclosure.

Optionally, as shown in FIGS. 11 to 13, the at least one internal transmission bus 101 may further include a second internal bus 112, and the second internal bus 112 is located on the side of the first internal bus 111 that is away from the active area A. In other words, the first internal bus 111 is located on the side of the second internal bus 112 that is close to the active area A. The arranging direction of the first via hole 87 and the second via hole 88 that connect the testing-signal lead wire 33 and the second internal bus 112 may be parallel to the extending direction of the second internal bus 112.

As shown in FIGS. 11 to 13, both of the orthographic projections of the first via hole 87 and the second via hole 88 connecting the testing-signal lead wire 33 and the second internal bus 112 on the plane where the first internal bus 111 is located are located within the area of the first internal bus 111.

Because the first internal bus 111 has a lower distance from the active area A, the testing-signal lead wires 33 that are required to be disposed in the first direction have a higher quantity, and the available room for the via holes is smaller, the two via holes connecting any one of the testing-signal lead wires 33 and the first internal bus 111 (the first via hole 87 and the second via hole 88) may be arranged perpendicular to the extending direction of the first internal bus 111, to reduce the risk of short circuiting.

Because the second internal bus 112 has a higher distance from the active area A, the testing-signal lead wires 33 that are required to be disposed in the first direction have a lower quantity, and the available room for the via holes is larger, the two via holes connecting any one of the testing-signal lead wires 33 and the second internal bus 112 (the first via hole 87 and the second via hole 88) may be arranged parallel to the extending direction of the first internal bus 111, which may reduce the room occupation by the inputting area B3 in the direction perpendicular to the first direction, to facilitate to reduce the size of the border frame of the display panel.

Figure 10:
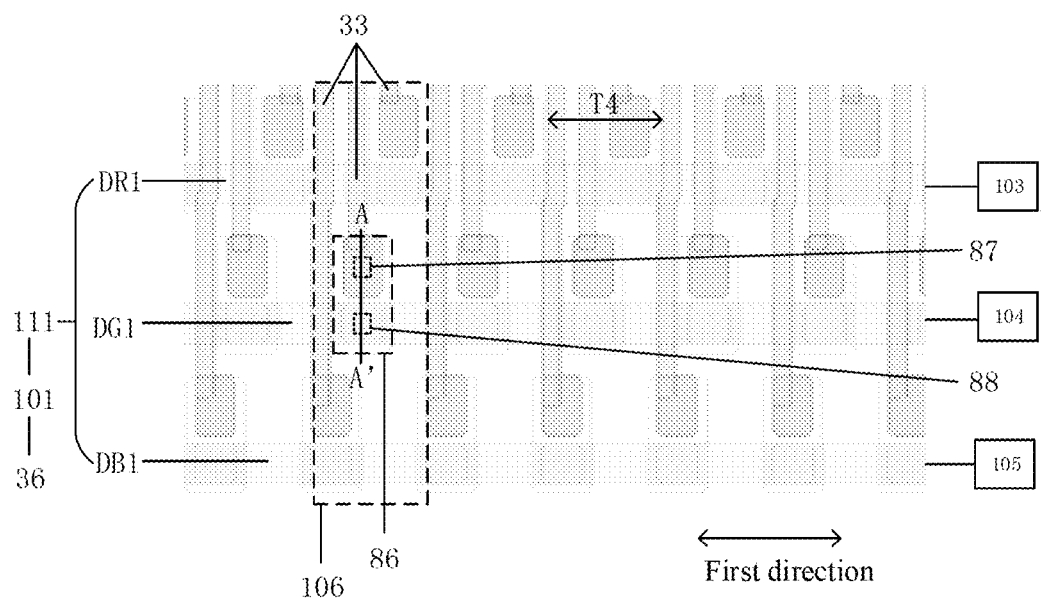
FIG. 10 schematically shows a schematic structural diagram of the first type of the inputting area according to the present disclosure.

In FIG. 10, all of the testing-signal bus lines 36 within the inputting area B3 are the internal transmission buses 101; in other words, all of the testing-signal bus lines 36 at located at the first metal layer 81. Further, all of the internal transmission buses 101 may be the first internal buses 111, as shown in FIG. 10, which is not limited in the present disclosure.

In FIGS. 11 to 13, some of the testing-signal bus lines 36 within the inputting area B3 are the internal transmission buses 101. In a particular implementation, the quantities of the first internal buses 111 and the second internal buses 112 may be configured according to the practical room. As shown in FIG. 11, the quantity of the first internal buses 111 is 2, and the quantity of the second internal buses 112 is 1. As shown in FIG. 12, the quantity of the first internal buses 111 is 2, and the quantity of the second internal buses 112 is 2. As shown in FIG. 13, the quantity of the first internal buses 111 is 2, and the quantity of the second internal buses 112 is 3.

Optionally, as shown in FIGS. 11 to 13, the plurality of testing-signal bus lines 36 further include an edge transmission bus 102, the edge transmission bus 102 is located on one side of the at least one internal transmission bus 101 that is away from the active area A, the edge transmission bus 102 is located at the second metal layer 82, and the edge transmission bus 102 and the testing-signal lead wires 33 that are interconnected are of an integral structure.

In a particular implementation, within the inputting area B3, all of the testing-signal bus lines 36 other than the edge transmission bus 102 may be the internal transmission buses 101.

In the present implementation, the edge transmission bus 102 and the testing-signal lead wires 33 are located at the same one layer, i.e., the second metal layer 82, and the edge transmission bus 102 and the testing-signal lead wires 33 that are interconnected may be directly connected or be of an integral structure, and are not required to be connected by via holes, which saves the room occupied by via holes, which may further reduce the room occupation by the inputting area B3 in the direction perpendicular to the first direction, to facilitate to reduce the size of the border frame of the display panel.

In the present implementation, by disposing the one testing-signal bus line 36 at the outmost side (having the largest distance from the active area A), i.e., the edge transmission bus 102, at the second metal layer 82, short circuiting between the edge transmission bus 102 and the internal testing-signal lead wires 33 may be prevented. The internal testing-signal lead wires 33 refer to the testing-signal lead wires 33 connected to the internal transmission bus 101.

In a particular implementation, the provision of the plurality of testing-signal bus lines 36 within the inputting area B3 may have multiple implementations.

In a first implementation, as shown in FIG. 10, the plurality of testing-signal bus lines 36 include a first testing-signal bus line DR1, a second testing-signal bus line DG1 and a third testing-signal bus line DB1.

The first testing-signal bus line DR1 is configured to input a first testing signal to data lines of first-color sub-pixels, the second testing-signal bus line DG1 is configured to input a second testing signal to data lines of second-color sub-pixels, and the third festing-signal bus line DB1 is configured to input a third testing signal to data lines of third-color sub-pixels.

The emitted-light colors of the first-color sub-pixels, the second-color sub-pixels and the third-color sub-pixels are different from each other.

The present embodiment illustrates by taking the case as an example in which the first-color sub-pixels are red-color sub-pixels, the second-color sub-pixels are green-color sub-pixels and the third-color sub-pixels are blue-color sub-pixels.

In the present implementation, the inputting area B3 further includes a first signal inputting terminal 103, a second signal inputting terminal 104 and a third signal inputting terminal 105. The first testing-signal bus line DR1 is connected to the first signal inputting terminal 103, the second testing-signal bus line DG1 is connected to the second signal inputting terminal 104, and the third testing-signal bus line DB1 is connected to the third signal inputting terminal 105.

In the present implementation, the different testing-signal bus lines 36 within the inputting area B3 are configured to be connected to the data lines 22 of the sub-pixels of different colors. When the active area A includes the sub-pixels of three colors, at least three testing-signal bus lines 36 are required. When the inputting area B3 is provided with merely three testing-signal bus lines 36, i.e., provided with the minimum quantity of the testing-signal bus lines 36, the room occupation by the inputting area B3 may be reduced, to reduce the size of the border frame of the display panel.

In a second implementation, as shown in FIG. 11, the plurality of testing-signal bus lines 36 further include a fourth testing-signal bus line DR2, and the fourth testing-signal bus line DR2 is configured to input a fourth testing signal to data lines of fourth-color sub-pixels.

Figure 14:
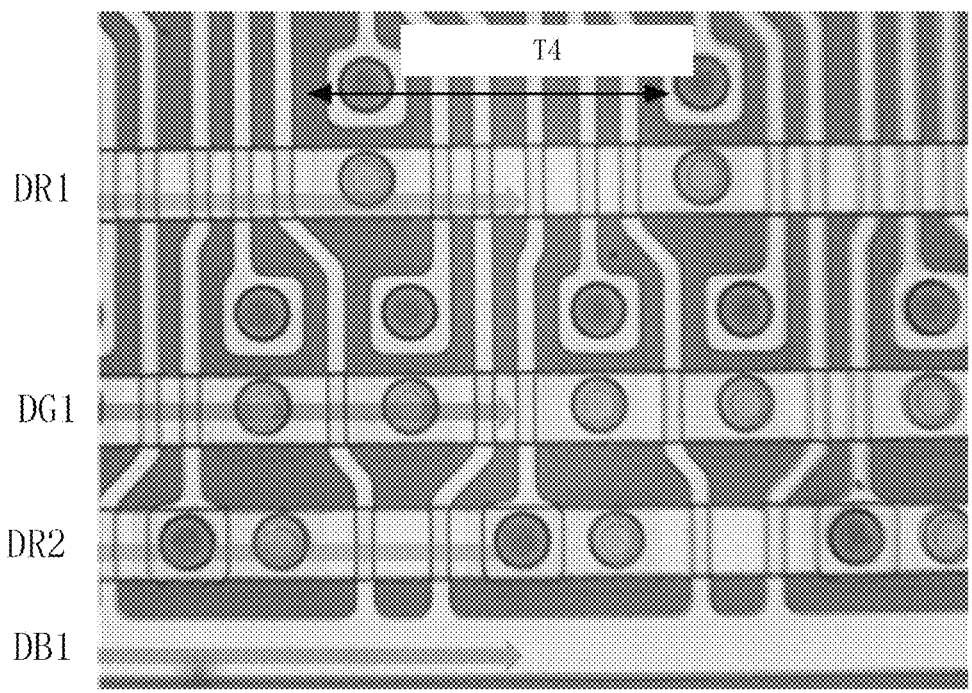
FIG. 14 schematically shows a physical picture of the structure of the second type of the inputting area according to the present disclosure.

Referring to FIG. 14, FIG. 14 shows a physical picture of the structure of the inputting area shown in FIG. 11.

The emitted-light colors of the fourth-color sub-pixels and the first-color sub-pixels are the same, and the data lines connected to the fourth testing-signal bus line DR2 and the data lines connected to the first testing-signal bus line DR1 are alternately arranged.

Assuming that the sub-pixels of the 1st column, the 4th column, the 7th column, the 10th column and the 13th column within the active area are the red-color sub-pixels, then the sub-pixels of the 1st column, the 7th column and the 13th column may be the first-color sub-pixels, and connected to the first testing-signal bus line DR1 via the data lines and the testing-signal lead wires 33. The sub-pixels of the 4th column and the 10th column may be the fourth-color sub-pixels, and connected to the fourth testing-signal bus line DR2 via the data lines and the testing-signal lead wires 33. Accordingly, the alternate arrangement between the data lines connected to the fourth testing-signal bus line DR2 and the data lines connected to the first testing-signal bus line DR1 may be realized.

Optionally, both of the fourth testing-signal bus line DR2 and the first testing-signal bus line DR1 may be connected to the first signal inputting terminal 103, to ensure that the fourth testing signal and the first testing signal are the same.

In the present implementation, the first-color sub-pixels and the fourth-color sub-pixels are sub-pixels of the same color, and both of them are the red-color sub-pixels. The first testing-signal bus line DR1 and the fourth testing-signal bus line DR2 are connected in parallel, one part of the red-color sub-pixels, for example, the first-color sub-pixels, are connected to the first testing-signal bus line DR1, and the other part of the red-color sub-pixels, for example, the fourth-color sub-pixels, are connected to the fourth testing-signal bus line DR2. Therefore, the quantity of the via holes in the first testing-signal bus line DR1 or the fourth testing-signal bus line DR2 may be reduced, to ensure that the first via holes 87 corresponding to the first testing-signal bus line DR1 or the fourth testing-signal bus line DR2 have a large available room, which may increase the line widths of the testing-signal lead wires 33 at those first via holes 87, to realize that each of the testing-signal lead wires 33 covers the orthographic projection of the first via hole 87 on the plane where the testing-signal lead wire 33 is located, thereby reducing the risk of via-hole failure and extremely large resistance.

In a third implementation, as shown in FIG. 12, the plurality of testing-signal bus lines 36 further include a fifth testing-signal bus line DG2, and the fifth testing-signal bus line DG2 is configured to input a fifth testing signal to data lines of fifth-color sub-pixels.

The emitted-light colors of the fifth-color sub-pixels and the second-color sub-pixels are the same, and the data lines connected to the fifth testing-signal bus line DG2 and the data lines connected to the second testing-signal bus line DG1 are alternately arranged.

Assuming that the sub-pixels of the 2nd column, the 5th column, the 8th column, the 11th column and the 14th column within the active area are the green-color sub-pixels, then the sub-pixels of the 2nd column, the 8th column and the 14th column may be the second-color sub-pixels, and connected to the second testing-signal bus line DG1 via the data lines and the testing-signal lead wires 33. The sub-pixels of the 5th column and the 11th column may be the fifth-color sub-pixels, and connected to the fifth testing-signal bus line DG2 via the data lines and the testing-signal lead wires 33. Accordingly, the alternate arrangement between the data lines connected to the fifth testing-signal bus line DG2 and the data lines connected to the second testing-signal bus line DG1 may be realized.

Optionally, both of the fifth testing-signal bus line DG2 and the second testing-signal bus line DG1 may be connected to the second signal inputting terminal 104, to ensure that the fifth testing signal and the second testing signal are the same.

In the present implementation, the fifth-color sub-pixels and the second-color sub-pixels are sub-pixels of the same color, and both of them are the green-color sub-pixels. The second testing-signal bus line DG1 and the fifth testing-signal bus line DG2 are connected in parallel, one part of the green-color sub-pixels, for example, the second-color sub-pixels, are connected to the second testing-signal bus line DG1, and the other part of the green-color sub-pixels, for example, the fifth-color sub-pixels, are connected to the fifth testing-signal bus line DG2. Therefore, the quantity of the via holes in the second testing-signal bus line DG1 or the fifth testing-signal bus line DG2 may be reduced, to ensure that the first via boles 87 corresponding to the second testing-signal bus line DG1 or the fifth testing-signal bus line DG2 have a large available room, which may increase the line widths of the testing-signal lead wires 33 at those first via holes 87, to realize that each of the testing-signal lead wires 33 covers the orthographic projection of the first via hole 87 on the plane where the testing-signal lead wire 33 is located, thereby reducing the risk of via-hole failure and extremely large resistance.

In a fourth implementation, as shown in FIG. 13, the plurality of testing-signal bus lines 36 further include a sixth testing-signal bus line DB2, and the sixth testing-signal bus line DB2 is configured to input a sixth testing signal to a data lines 22 of sixth-color sub-pixels.

The emitted-light colors of the sixth-color sub-pixels and the third-color sub-pixels are the same, and the data lines 22 connected to the sixth testing-signal bus line DB2 and the data lines 22 connected to the third testing-signal bus line DB1 are alternately arranged.

Assuming that the sub-pixels of the 3rd column, the 6th column, the 9th column, the 12th column and the 15th column within the active area are the blue-color sub-pixels, then the sub-pixels of the 3rd column, the 9th column and the 15th column may be the third-color sub-pixels, and connected to the third testing-signal bus line DB1 via the data lines and the testing-signal lead wires 33. The sub-pixels of the 6th column and the 12th column may be the sixth-color sub-pixels, and connected to the sixth testing-signal bus line DB2 via the data lines and the testing-signal lead wires 33. Accordingly, the alternate arrangement between the data lines connected to the sixth testing-signal bus line DB2 and the data lines connected to the third testing-signal bus line DB1 may be realized.

Optionally, both of the sixth testing-signal bus line DB2 and the third testing-signal bus line DB1 may be connected to the third signal inputting terminal 105, to ensure that the sixth testing signal and the third testing signal are the same.

In the present implementation, the sixth-color sub-pixels and the third-color sub-pixels are sub-pixels of the same color, and both of them are the blue-color sub-pixels. The third testing-signal bus line DB1 and the sixth testing-signal bus line DB2 are connected in parallel, one part of the blue-color sub-pixels, for example, the third-color sub-pixels, are connected to the third testing-signal bus line DB1, and the other part of the blue-color sub-pixels, for example, the sixth-color sub-pixels, are connected to the sixth testing-signal bus line DB2. Therefore, the quantity of the via holes in the third testing-signal bus line DB1 or the sixth testing-signal bus line DB2 may be reduced, to ensure that the first via holes 87 corresponding to the third testing-signal bus line DB1 or the sixth testing-signal bus line DB2 have a large available room, which may increase the line widths of the testing-signal lead wires 33 at those first via holes 87, to realize that each of the testing-signal lead wires 33 covers the orthographic projection of the first via hole 87 on the plane where the testing-signal lead wire 33 is located, thereby reducing the risk of via-hole failure and extremely large resistance.

By connecting in parallel the plurality of testing-signal bus lines 36 that are connected to the sub-pixels of the same color, the present disclosure may increase the available room of the first via holes 87 connected to those testing-signal bus lines 36, and increase the line widths of the testing-signal lead wires 33 at the positions of those first via holes 87, to solve the problem of insufficient widths of the testing-signal lead wires 33 at the first via holes 87 caused by the technical limits, which satisfies the design trend of the increasingly smaller arrangement period of the bonding units 34, and facilitates the production of narrow-border-frame display panels.

With the increasingly smaller arrangement period of the bonding units 34, the plurality of testing-signal bus lines 36 connected to the first-color sub-pixels may be connected in parallel. Further, the plurality of testing-signal bus lines 36 connected to the first-color sub-pixels may be connected in parallel, and the plurality of testing-signal bus lines 36 connected to the second-color sub-pixels may be connected in parallel. Further, the plurality of testing-signal bus lines 36 connected to the first-color sub-pixels, the plurality of testing-signal bus lines 36 connected to the second-color sub-pixels may be connected in parallel and the plurality of testing-signal bus lines 36 connected to the third-color sub-pixels may be connected in parallel.

Furthermore, in order to obtain a large available room of the first via holes, in a particular implementation, the second metal layer 82 may be produced by using a phase shifting mask. Because the minimum trace spacing produced by using a phase shifting mask is 2.4 μm, and the minimum trace spacing produced by using a common mask is 4 μm, by producing the second metal layer 82 by using a phase shifting mask, the spacing between the testing-signal lead wires 33 may be reduced, which may increase the available room of the first via holes 87, and increase the line widths of the testing-signal lead wires 33 at the first via holes 87, to ensure that each of the testing-signal lead wires 33 covers the orthographic projection of the first via hole 87 on the plane where the testing-signal lead wire 33 is located, thereby reducing the risk of via-hole failure and extremely large resistance.

When the size of the bonding area B2 is constant, the total width (the dimension perpendicular to the first direction) of the testing area B1 and the inputting area B3 shown in FIG. 3 is 285 micrometers, and the total width of the testing area B1 and the inputting area B3 shown in FIG. 1 is 320 micrometers. Accordingly, it can be seen that, by using the display panel according to the present application, and the size of the border frame of the display panel may be effectively reduced.

In an alternative implementation, as shown in FIGS. 10 to 13, within the inputting area B3, a plurality of testing-signal lead wires 33 form a plurality of lead-wire units 106, and the plurality of lead-wire units 106 are arranged periodically in the first direction.

In the first direction, the ratio of the arrangement period T4 of the lead-wire units 106 to the arrangement period T2 of the bonding units 34 is equal to the ratio of the quantity of the testing-signal lead wires 33 included in each of the lead-wire units 106 to the quantity of the bonding pads 35 included in each of the bonding units 34.

Because the ratio of the arrangement period T1 of the testing units 31 to the arrangement period T2 of the bonding units 34 is equal to the ratio of the quantity of the switching transistors 32 included in the testing unit 31 to the quantity of the bonding pads 35 included in the bonding unit 34, the ratio of the arrangement period T4 of the lead-wire units 106 to the arrangement period T1 of the testing units 31 is equal to the ratio of the quantity of the testing-signal lead wires 33 included in the lead-wire unit 106 to the quantity of the switching transistors 32 included in the testing unit 31.

In the present implementation, within a certain width range in the first direction, the quantity of the testing-signal lead wires 33 and the quantity of the switching transistors 32 are equal, and they are connected to each other correspondingly one to one. By the rational design, the length evenness of the testing-signal lead wires 33 may be improved.

In a particular implementation, the plurality of sub-pixels 21 may include sub-pixels 21 of N colors, wherein N is greater than or equal to 1.

If the quantity of the testing-signal bus lines 36 is N, and all of the data lines 22 of the sub-pixels 21 of the same color are connected to the same one testing-signal bus line 36, then the quantity of the testing-signal lead wires 33 included in each of the lead-wire units 106 may be N.

If the quantity of the testing-signal bus lines 36 is greater than a×N, and less than or equal to (a+1) N, and the quantity of the testing-signal bus lines 36 that are connected to all of the data lines 22 of the sub-pixels 21 of the same color is greater than or equal to a, and less than or equal to a+1, then the quantity of the testing-signal lead wires 33 included in each of the lead-wire units 106 may be (a+1)×N, wherein a is a positive integer.

As shown in FIG. 10, the active area A includes the sub-pixels 21 of three colors (for example, red-color sub-pixels, green-color sub-pixels and blue-color sub-pixels, wherein N=3), and the quantity of the testing-signal bus lines 36 is N=3. The data lines of all of the red-color sub-pixels are connected to the first testing-signal bus line DR1 via the testing-signal lead wires 33. The data lines of all of the green-color sub-pixels are connected to the second testing-signal bus line DG1 via the testing-signal lead wires 33. The data lines of all of the blue-color sub-pixels are connected to the third testing-signal bus line DB1 via the testing-signal lead wires 33. In such a case, the quantity of the testing-signal lead wires 33 included in each of the lead-wire units 106 is N=3.

As shown in FIG. 11, the active area A includes the sub-pixels 21 of three colors (for example, red-color sub-pixels, green-color sub-pixels and blue-color sub-pixels, wherein N=3), and the quantity of the testing-signal bus lines 36 is 4. Because 4 is greater than 1×3 and less than 2×3, a=1. The quantity of the testing-signal bus lines 36 connected to the sub-pixels 21 of the same color is at least one, and at most two. As shown in FIG. 11, one part of the red-color sub-pixels, for example, the first-color sub-pixels, are connected to the first testing-signal bus line DR1, and the other part of the red-color sub-pixels, for example, the fourth-color sub-pixels, are connected to the fourth testing-signal bus line DR2. The data lines of all of the green-color sub-pixels are connected to the second testing-signal bus line DG1 via the testing-signal lead wires 33. The data lines of all of the blue-color sub-pixels are connected to the third testing-signal bus line DB1 via the testing-signal lead wires 33. In such a case, the quantity of the testing-signal lead wires 33 included in each of the lead-wire units 106 is (a+1)/N=6.

As shown in FIG. 12, the active area A includes the sub-pixels 21 of three colors (for example, red-color sub-pixels, green-color sub-pixels and blue-color sub-pixels, wherein N=3), and the quantity of the testing-signal bus lines 36 is 5. Because 5 is greater than ⅓ and less than 2×3, a=1. The quantity of the testing-signal bus lines 36 connected to the sub-pixels 21 of the same color is at least one, and at most two. As shown in FIG. 12, one part of the red-color sub-pixels, for example, the first-color sub-pixels, are connected to the first testing-signal bus line DR1, and the other part of the red-color sub-pixels, for example, the fourth-color sub-pixels, are connected to the fourth testing-signal bus line DR2. One part of the green-color sub-pixels, for example, the second-color sub-pixels, are connected to the second testing-signal bus line DG1, and the other part of the green-color sub-pixels, for example, the fifth-color sub-pixels, are connected to the fifth testing-signal bus line DG2. The data lines of all of the blue-color sub-pixels are connected to the third testing-signal bus line DB1 via the testing-signal lead wires 33. In such a case, the quantity of the testing-signal lead wires 33 included in each of the lead-wire units 106 is (a+1)×N=6.

As shown in FIG. 13, the active area A includes the sub-pixels 21 of three colors (for example, red-color sub-pixels, green-color sub-pixels and blue-color sub-pixels, wherein N=3), and the quantity of the testing-signal bus lines 36 is 6. Because 6 is equal to 2×3, a=1. The quantity of the testing-signal bus lines 36 connected to the sub-pixels 21 of the same color is at least one, and at most two. As shown in FIG. 13, one part of the red-color sub-pixels, for example, the first-color sub-pixels, are connected to the first testing-signal bus line DR1, and the other part of the red-color sub-pixels, for example, the fourth-color sub-pixels, are connected to the fourth testing-signal bus line DR2. One part of the green-color sub-pixels, for example, the second-color sub-pixels, are connected to the second testing-signal bus line DG1, and the other part of the green-color sub-pixels, for example, the fifth-color sub-pixels, are connected to the fifth testing-signal bus line DG2. One part of the blue-color sub-pixels, for example, the third-color sub-pixels, are connected to the third testing-signal bus line DB1, and the other part of the blue-color sub-pixels, for example, the sixth-color sub-pixels, are connected to the sixth testing-signal bus line DB2. In such a case, the quantity of the testing-signal lead wires 33 included in each of the lead-wire units 106 is (a+1)×N=6.

As shown in FIG. 10, the quantity of the testing-signal lead wires 33 included in each of the lead-wire units 106 is 3, the quantity of the bonding pads 35 included in the bonding unit 34 is 3, the arrangement period of the bonding units 34 is 33 μm, and the arrangement period of the lead-wire units 106 is 33 μm.

As shown in FIGS. 11 to 13, the quantity of the testing-signal lead wires 33 included in each of the lead-wire units 106 is 6, the quantity of the bonding pads 35 included in the bonding unit 34 is 3, the arrangement period of the bonding units 34 is 33 μm, and the arrangement period of the lead-wire units 106 is 66 μm.

An embodiment of the present disclosure further provides a display device, wherein the display device includes the display panel according to any one of the above embodiments.

The display device may be any products or components that have the function of displaying, such as a mobile phone, a tablet personal computer, a television set, a display, a notebook computer, a digital photo frame and a navigator. Its implementation principle and advantageous effects are the same as the implementation principle and the advantageous effects of the display panel described above, which is not discussed herein further.

The embodiments of the description are described in the mode of progression, each of the embodiments emphatically describes the differences from the other embodiments, and the same or similar parts of the embodiments may refer to each other.

Finally, it should also be noted that, in the present text, relation terms such as first and second are merely intended to distinguish one entity or operation from another entity or operation, and that does not necessarily require or imply that those entities or operations have therebetween any such actual relation or order. Furthermore, the terms "include", "include" or any variants thereof are intended to cover non-exclusive inclusions, so that processes, methods, articles or devices that include a series of elements do not only include those elements, but also include other elements that are not explicitly listed, or include the elements that are inherent to such processes, methods, articles or devices. Unless further limitation is set forth, an element defined by the wording "including a . . . " does not exclude additional same element in the process, method, article or device including the element.

The display panel and the display device according to the present disclosure has been described in detail above. The principle and the embodiments of the present disclosure are described herein with reference to the particular examples, and the description of the above embodiments is merely intended to facilitate to understand the method according to the present disclosure and its core concept. Moreover, for a person skilled in the art, according to the concept of the present disclosure, the particular embodiments and the range of application may be varied. In conclusion, the contents of the description should not be understood as limiting the present disclosure.

A person skilled in the art, after considering the description and implementing the invention disclosed herein, will readily envisage other embodiments of the present disclosure. The present disclosure aims at encompassing any variations, uses or adaptative alterations of the present disclosure, wherein those variations, uses or adaptative alterations follow the general principle of the present disclosure and include common knowledge or common technical means in the art that are not disclosed by the present disclosure. The description and the embodiments are merely deemed as exemplary, and the true scope and spirit of the present disclosure are presented by the following claims.

It should be understood that the present disclosure is not limited to the accurate structure that has been described above and shown in the drawings, and may have various modifications and variations without departing from its scope. The scope of the present disclosure is merely limited by the appended claims.

The "one embodiment", "an embodiment" or "one or more embodiments" as used herein means that particular features, structures or characteristics described with reference to an embodiment are included in at least one embodiment of the present disclosure. Moreover, it should be noted that here an example using the wording "in an embodiment" does not necessarily refer to the same one embodiment.

The description provided herein describes many concrete details. However, it may be understood that the embodiments of the present disclosure may be implemented without those concrete details. In some of the embodiments, well-known processes, structures and techniques are not described in detail, so as not to affect the understanding of the description.

In the claims, any reference signs between parentheses should not be construed as limiting the claims. The word "include" does not exclude elements or steps that are not listed in the claims. The word "a" or "an" preceding an element does not exclude the existing of a plurality of such elements. The present disclosure may be implemented by means of hardware including several different elements and by means of a properly programmed computer. In unit claims that list several devices, some of those devices may be embodied by the same item of hardware. The words first, second, third and so on do not denote any order. Those words may be interpreted as names.

Finally, it should be noted that the above embodiments are merely intended to explain the technical solutions of the present disclosure, and not to limit them. Although the present disclosure is explained in detail with reference to the above embodiments, a person skilled in the art should understand that he may still modify the technical solutions set forth by the above embodiments, or make equivalent substitutions to part of the technical features of them. However, those modifications or substitutions do not make the essence of the corresponding technical solutions depart from the spirit and scope of the technical solutions of the embodiments of the present disclosure.

The invention claimed is:

1. A display panel, wherein the display panel comprises an active area and a border-frame area located at a periphery of the active area, the active area comprises a plurality of sub-pixels and a plurality of data lines connected to the sub-pixels, and the border-frame area comprises a testing area and a bonding area;

the testing area comprises a plurality of testing units that are arranged periodically in a first direction, each of the testing units comprises one or more switching transistors, a first electrode of each of the switching transistors is connected to a testing-signal lead wire, the testing-signal lead wire is configured to transmit a testing signal, and a second electrode of the switching transistor is connected to one of the data lines;

the bonding area comprises a plurality of bonding units that are arranged periodically in the first direction, each of the bonding units comprises one or more bonding pads, and each of the bonding pads is connected to one of the data lines; and in the first direction, a ratio of a quantity of the switching transistors comprised in one arrangement period of the testing units to a quantity of the bonding pads comprised in one arrangement period of the bonding units is greater than 0 and less than 2;

wherein the border-frame area further comprises an inputting area, the inputting area is located on one side of the testing area that is away from the active area, the inputting area comprises a plurality of testing-signal bus lines, and an extending direction of the testing-signal bus lines intersects with an extending direction of the testing-signal lead wires; and the testing-signal bus lines are connected to the testing-signal lead wires, and the testing-signal bus lines are configured to input a testing signal via the testing-signal lead wires to data lines of sub-pixels of a same color;

wherein the plurality of testing-signal bus lines comprise at least one internal transmission bus, and the internal transmission bus is located at a first metal layer;

the testing-signal lead wires are located at a second metal layer, and a first insulating layer is disposed between the first metal layer and the second metal layer;

a second insulating layer is disposed on one side of the second metal layer that is back away from the first metal layer, a first electrode layer is disposed on one side of the second insulating layer that is back away from the first metal layer, and the first electrode layer comprises a plurality of switching electrodes; or a third insulating layer is disposed on one side of the first metal layer that is back away from the second metal layer, a second electrode layer is disposed on one side of the third insulating layer that is back away from the second metal layer, and the second electrode layer comprises a plurality of switching electrodes;

the testing-signal lead wires and the internal transmission bus are connected by the switching electrodes; and a first part of each of the switching electrodes is connected to one of the testing-signal lead wires by a first via hole, and a second part of the switching electrode is connected to the internal transmission bus by a second via hole.

2. The display panel according to claim 1, wherein within the testing area, all of the testing-signal lead wires and the data lines extend in a second direction, wherein the second direction is perpendicular to the first direction; and a part of the testing-signal lead wire is further used as the first electrode of the switching transistor, and a part of the data line is further used as the second electrode of the switching transistor.

3. The display panel according to claim 1, wherein each of the testing units comprises a plurality of switching transistors;

within the testing unit, all of first electrodes of the switching transistors are located on same sides of second electrodes of the switching transistor, and orthographic projections of the switching transistors in a second direction do not intersect or overlap with each other, wherein the second direction is perpendicular to the first direction; and the plurality of switching transistors comprise a first transistor and a second transistor, and an orthographic projection of a second electrode of the first transistor and an orthographic projection of a first electrode of the second transistor in the first direction intersect or overlap.

4. The display panel according to claim 3, wherein within the testing unit, the plurality of switching transistors further comprise a third transistor, the third transistor is close to the second transistor, and an orthographic projection of the second electrode of the second transistor and an orthographic projection of a first electrode of the third transistor in the first direction intersect or overlap.

5. The display panel according to claim 1, wherein the testing area and the bonding area are located on two opposite sides of the active area.

6. The display panel according to claim 1, wherein the testing area and the bonding area are located on a same one side of the active area, and the bonding area is located between the active area and the testing area.

7. The display panel according to claim 6, wherein the data lines comprise data transmission lines and data inputting lines, two ends of each of the data transmission lines are connected to the second electrode of the switching transistor and a first end of the bonding pad, and a second end of the bonding pad is connected to one of the data inputting lines.

8. The display panel according to claim 1, wherein each of the switching transistors comprises a channel area, and a width-length ratio of the channel area is greater than or equal to 13/3, and less than or equal to 200/4.

9. The display panel according to claim 1, wherein an orthographic projection of the first via hole on a plane where the testing-signal lead wire is located is located within an area of the testing-signal lead wire.

10. The display panel according to claim 1, wherein the at least one internal transmission bus comprises a first internal bus and a second internal bus, and the first internal bus is located on one side of the second internal bus that is close to the active area;

an arranging direction of a first via hole and a second via hole that connect the testing-signal lead wire and the first internal bus is perpendicular to an extending direction of the first internal bus; and an arranging direction of a first via hole and a second via hole that connect the testing-signal lead wire and the second internal bus is parallel to an extending direction of the second internal bus.

11. The display panel according to claim 1, wherein the plurality of testing-signal bus lines further comprise an edge transmission bus, the edge transmission bus is located on one side of the at least one internal transmission bus that is away from the active area, the edge transmission bus is located at the second metal layer, and the edge transmission bus and the testing-signal lead wires that are interconnected are of an integral structure.

12. A display panel, wherein the display panel comprises an active area and a border-frame area located at a periphery of the active area, the active area comprises a plurality of sub-pixels and a plurality of data lines connected to the sub-pixels, and the border-frame area comprises a testing area and a bonding area;

the testing area comprises a plurality of testing units that are arranged periodically in a first direction, each of the testing units comprises one or more switching transistors, a first electrode of each of the switching transistors is connected to a testing-signal lead wire, the testing-signal lead wire is configured to transmit a testing signal, and a second electrode of the switching transistor is connected to one of the data lines;

the bonding area comprises a plurality of bonding units that are arranged periodically in the first direction, each of the bonding units comprises one or more bonding pads, and each of the bonding pads is connected to one of the data lines; and in the first direction, a ratio of a quantity of the switching transistors comprised in one arrangement period of the testing units to a quantity of the bonding pads comprised in one arrangement period of the bonding units is greater than 0 and less than 2;

wherein the border-frame area further comprises an inputting area, the inputting area is located on one side of the testing area that is away from the active area, the inputting area comprises a plurality of testing-signal bus lines, and an extending direction of the testing-signal bus lines intersects with an extending direction of the testing-signal lead wires; and the testing-signal bus lines are connected to the testing-signal lead wires, and the testing-signal bus lines are configured to input a testing signal via the testing-signal lead wires to data lines of sub-pixels of a same color;

wherein the plurality of testing-signal bus lines comprise a first testing-signal bus, a second testing-signal bus line and a third testing-signal bus;

the first testing-signal bus line is configured to input a first testing signal to data lines of first-color sub-pixels, the second testing-signal bus line is configured to input a second testing signal to data lines of second-color sub-pixels, and the third testing-signal bus line is configured to input a third testing signal to data lines of third-color sub-pixels; and emitted-light colors of the first-color sub-pixels, the second-color sub-pixels and the third-color sub-pixels are different from each other.

13. The display panel according to claim 12, wherein the plurality of testing-signal bus lines further comprise a fourth testing-signal bus, and the fourth testing-signal bus line is configured to input a fourth testing signal to data lines of fourth-color sub-pixels; and emitted-light colors of the fourth-color sub-pixels and the first-color sub-pixels are the same, and the data lines connected to the fourth testing-signal bus line and the data lines connected to the first testing-signal bus line are alternately arranged.

14. The display panel according to claim 13, wherein the plurality of testing-signal bus lines further comprise a fifth testing-signal bus, and the fifth testing-signal bus line is configured to input a fifth testing signal to data lines of fifth-color sub-pixels; and emitted-light colors of the fifth-color sub-pixels and the second-color sub-pixels are the same, and the data lines connected to the fifth testing-signal bus line and the data lines connected to the second testing-signal bus line are alternately arranged.

15. The display panel according to claim 14, wherein the plurality of testing-signal bus lines further comprise a sixth testing-signal bus, and the sixth testing-signal bus line is configured to input a sixth testing signal to data lines of sixth-color sub-pixels; and emitted-light colors of the sixth-color sub-pixels and the third-color sub-pixels are the same, and the data lines connected to the sixth testing-signal bus line and the data lines connected to the third testing-signal bus line are alternately arranged;

wherein the inputting area further comprises a first signal inputting terminal, a second signal inputting terminal and a third signal inputting terminal; and both of the fourth testing-signal bus line and the first testing-signal bus line are connected to the first signal inputting terminal, both of the fifth testing-signal bus line and the second testing-signal bus line are connected to the second signal inputting terminal, and both of the sixth testing-signal bus line and the third testing-signal bus line are connected to the third signal inputting terminal.

16. A display panel, wherein the display panel comprises an active area and a border-frame area located at a periphery of the active area, the active area comprises a plurality of sub-pixels and a plurality of data lines connected to the sub-pixels, and the border-frame area comprises a testing area and a bonding area;

the testing area comprises a plurality of testing units that are arranged periodically in a first direction, each of the testing units comprises one or more switching transistors, a first electrode of each of the switching transistors is connected to a testing-signal lead wire, the testing-signal lead wire is configured to transmit a testing signal, and a second electrode of the switching transistor is connected to one of the data lines;

the bonding area comprises a plurality of bonding units that are arranged periodically in the first direction, each of the bonding units comprises one or more bonding pads, and each of the bonding pads is connected to one of the data lines; and in the first direction, a ratio of a quantity of the switching transistors comprised in one arrangement period of the testing units to a quantity of the bonding pads comprised in one arrangement period of the bonding units is greater than 0 and less than 2;

wherein the border-frame area further comprises an inputting area, the inputting area is located on one side of the testing area that is away from the active area, the inputting area comprises a plurality of testing-signal bus lines, and an extending direction of the testing-signal bus lines intersects with an extending direction of the testing-signal lead wires; and the testing-signal bus lines are connected to the testing-signal lead wires, and the testing-signal bus lines are configured to input a testing signal via the testing-signal lead wires to data lines of sub-pixels of a same color;

wherein within the inputting area, a plurality of the testing-signal lead wires form a plurality of lead-wire units, and the plurality of lead-wire units are arranged periodically in the first direction; and in the first direction, a ratio of an arrangement period of the lead-wire units to an arrangement period of the bonding units is equal to a ratio of a quantity of the testing-signal lead wires comprised in each of the lead-wire units to a quantity of the bonding pads comprised in each of the bonding units.

17. The display panel according to claim 16, wherein the plurality of sub-pixels comprise sub-pixels of N colors, wherein N is greater than or equal to 1;

when the quantity of the testing-signal bus lines is N, and all of the data lines of the sub-pixels of a same color are connected to a same one testing-signal bus line, the quantity of the testing-signal lead wires comprised in each of the lead-wire units is N; and when the quantity of the testing-signal bus lines is greater than a×N, and less than or equal to (a+1)×N, and a quantity of the testing-signal bus lines that are connected to all of the data lines of the sub-pixels of a same color is greater than or equal to a, and less than or equal to a+1, the quantity of the testing-signal lead wires comprised in each of the lead-wire units is (a+1)×N, wherein a is a positive integer.

18. A display device, wherein the display device comprises the display panel according to claim 1.

* * * * *